Nov. 30, 1965 J. C. KOONZ ETAL 3,220,301

CODING AND PHOTOGRAPHING DEVICE

Filed July 11, 1960 2 Sheets-Sheet 1

INVENTORS.
JOHN C. KOONZ.
DONALD D. JENKINS.

BY Lockwood, Woodard, Smith & Weikart.
ATTORNEYS.

CODING AND PHOTOGRAPHING DEVICE

Filed July 11, 1960 2 Sheets-Sheet 2

INVENTORS.
JOHN C. KOONZ.
DONALD D. JENKINS.
BY
Lockwood, Woodard, Smith & Weikart.
ATTORNEYS.

United States Patent Office 3,220,301
Patented Nov. 30, 1965

3,220,301
CODING AND PHOTOGRAPHING DEVICE

John C. Koonz and Donald D. Jenkins, Fort Wayne, Ind., assignors to The Magnavox Company, Fort Wayne, Ind.

Filed July 11, 1960, Ser. No. 41,946
2 Claims. (Cl. 88—24)

This invention relates to filing and retrieval of documentary information and more particularly to apparatus for recording information on a storage medium and to the storage medium.

One method of filing documentary information involves the use of photography to record graphic and printed information in greatly reduced form on tiny pieces of film. The pieces of film are marked with coding suitable for machine reading techniques and are then filed in a much smaller space than would be occupied by conventional papers carrying the documentary information. The pieces of film are filed and retrieved by mechanism actuated by the said techniques. Such a method is accurate and dependable and, in the case of a large installation, provides profitable economy of space and labor.

Many business firms, however, cannot afford the great expense incident to a filing and retrieval system which is operated substantially automatically by coding on the film and devices for reading the coding. It is, therefore, desirable that there be provided a means of reducing the high cost of automatic filing devices without loss of the material advantage resulting from the small storage space required by greatly reduced photographs of the information to be stored.

It is, therefore, an object of the present invention to provide an information carrying medium and an apparatus for making such a medium which includes visually readable characters for filing or retrieving and a machine readable code for providing automatic filing and retrieving if so desired.

A further object of the invention is to provide an information carrying medium and an apparatus for making such a medium which locks together readable characters with coding suitable for actuating machine reading means.

Still another object of the invention is to provide an information carrying medium incorporating visually readable characters for aiding in filing the medium, a readable code for file retrieval by machine reading techniques, and also incorporating means for setting off or visually identifying and grouping the characters for assisting in reading the groups.

Still further objects and advantages of the invention will become apparent as the description proceeds.

In accordance with this invention there is provided an information storage medium in the form of a card or film having a first area adapted to store printed information in greatly reduced form, a second area having groups of visually readable characters displayed thereon, each character having aligned therewith an area displaying a machine readable code, whereby the card or film includes visually readable characters for filing or retrieving the card or film and a machine readable code for providing automatic filing and retrieval of the card or film if so desired.

In accordance with another feature of this invention there is provided apparatus for recording information on the information storage medium, described above, comprising a surface for supporting a sheet carrying printed information and a series of character and code displaying devices arranged adjacent to said sheet supporting surface, said devices being individually adjustable to display a visually readable character code and a machine readable code associated therewith, whereby said sheet and said devices may be photographed to provide a card or film bearing said printed information and the code information displayed by said devices.

The full nature of the invention will be understood from the accompanying drawings and the following description and claims:

Figure 1:
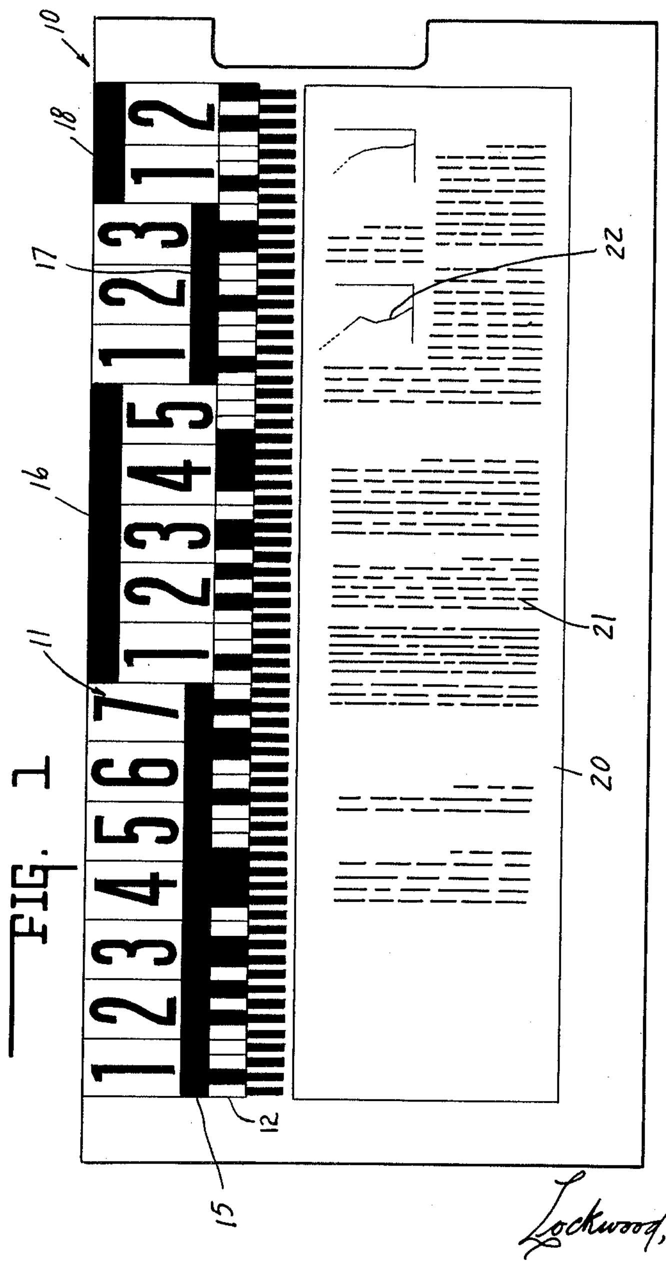
FIG. 1 is a plan view of an information carrying medium comprising a piece of photographic film as embodied in the present invention.

Referring now to the drawings, this invention comprises a card of photographic print paper or a piece of photographic film 10 having a generally rectangular shape and having an elongated code area 11 thereon, alloted to a display of characters, either alpha or numerical or both, and which are of a sufficiently large size to be easily read by a person holding the card 10. The card 10 has thereon and adjacent to the area 11, a further area 12 which is alloted to a display of coding suitable for actuating a machine reading device such, for example, as a photoelectric reading means. The coding is so arranged that there is adjacent to each of the characters in the area 11 a portion of coding which represents that particular character. Thus, a person viewing the card 10 may easily determine the coding thereon merely by reading the characters.

As can be seen from an examination of the drawing, the characters are divided into groups. A first group of characters includes the first seven characters in the upper lefthand corner of FIG. 1. These seven characters are underlined by a bar 15. A second group includes the next five characters to the right of the numbers 1–7. These numbers have thereover a bar 16. The remaining characters on the card are underlined and overlined at 17 and 18 in a manner similar to the above mentioned numbers. It can be seen that the bars 15, 16, 17 and 18 provide a means for setting off the different groups of characters, thereby making it easier for a person reading the characters to read them in their respective groups.

The above discussed characters make possible the filing of the card 10 without the use of machine or photoelectric reading means. Thus, the various cards may be hand filed according to the visible numerical legend thereon within suitable magazines. When it is desired to retrieve a particular one of the cards, suitable photoelectric reading means may be used to pick out the desired card by reading the code 12 on the card.

As can be seen from the drawing, the card further comprises a record area 20 adapted to receive information for storage. This information may be in many forms including printed form as at 21 or in graphic form as at 22. It will be understood that the recorded or stored information may be photographically reduced in size whereby several sheets of full size printed information may be stored on area 20.

Figure 2:
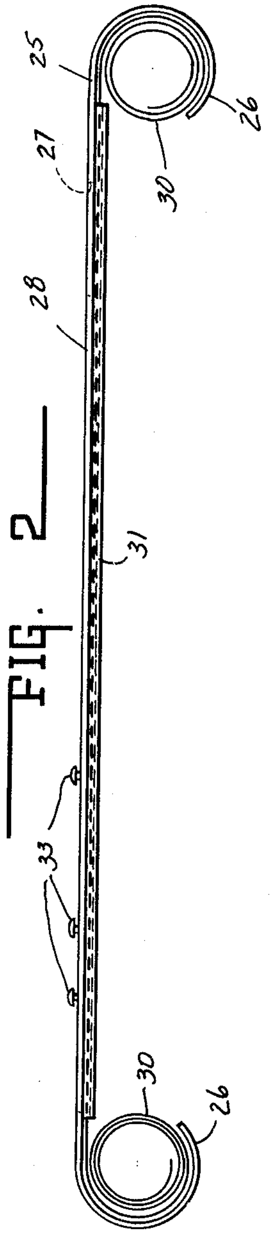
FIG. 2 is a side elevation of an apparatus for making an information carrying medium as embodied in the present invention.
Figures 3, 4, 5, 6:
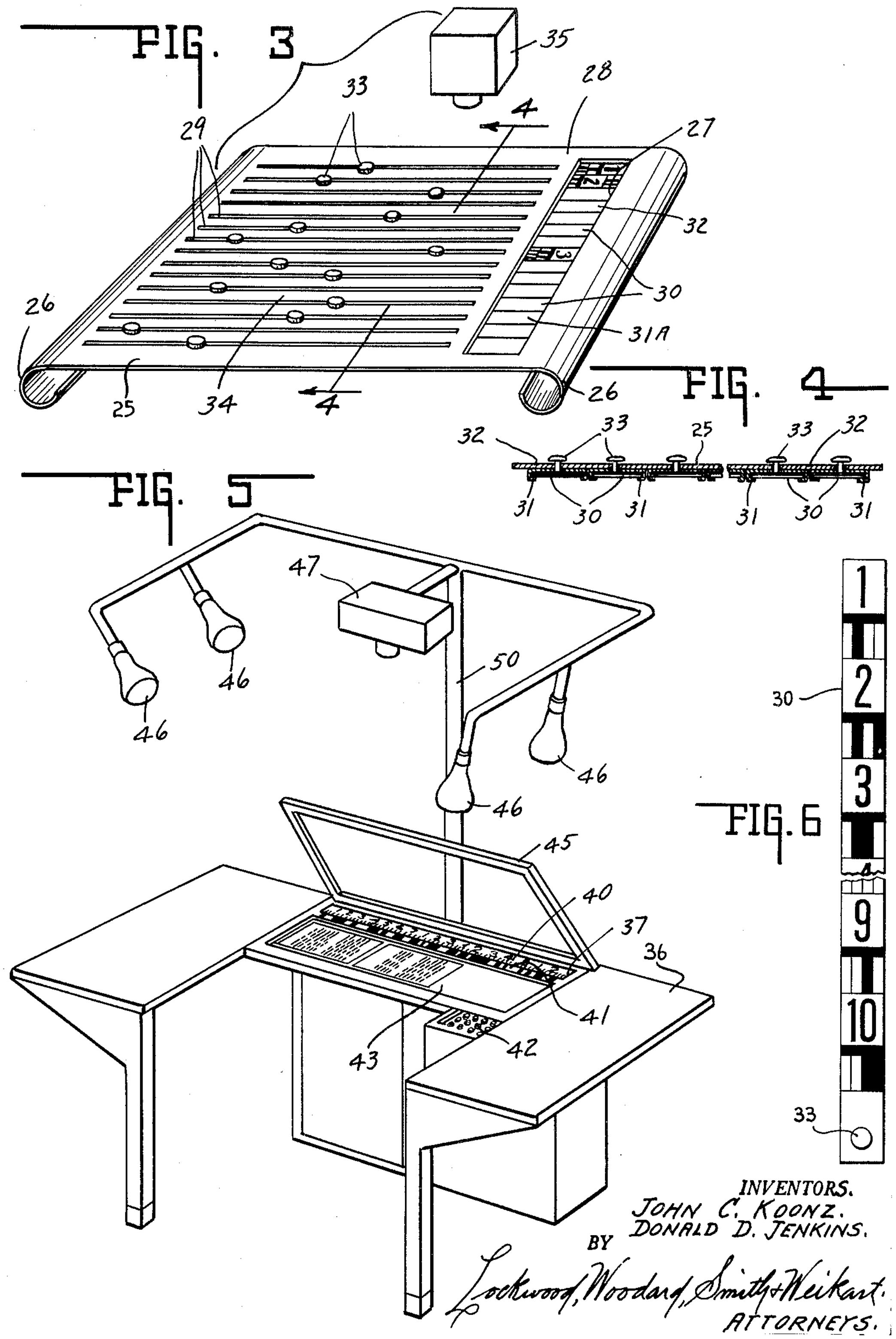
FIG. 3 is a reduced perspective view of the structure illustrated in FIG. 2 and additionally shows a camera also forming a part of the present invention.
FIG. 4 is an enlarged vertical section taken in the direction of the arrows and along the lines 4—4 of FIG. 3.
FIG. 5 is a perspective view of an alternative apparatus for making an information carrying medium as embodied in the present invention.
FIG. 6 is a top plan view of the tape member utilized in the apparatus of FIGS. 2 and 3.

Referring now to FIGS. 2–4, there is illustrated an apparatus for making a card such as that illustrated in FIG. 1. This apparatus comprises a base member 25 having partially curled ends 26—26. It should be understood that the member 25 and its ends 26 are formed of rigid material. The member 25 has an elongated slot 27 extending across the flat upwardly facing surface 28 of the member. A plurality of flexible metal tapes 30—30 are received within suitable trackways 31—31 in such a manner that the tapes 30 may be moved transversely of the slot 27, the trackways 31 being fixed to the lower surface of the base member.

Each of the tapes 30 has inscribed on its upwardly facing surface 32 a plurality of characters such as numbers in sequence and a coding portion beneath each number. These numbers and the adjacent coding are similar to the characters and coding described above with relation to the card 10, the numbers from 1 to 10 on each tape being arranged in order one number above the next and with the coding associated with each number located below the number. There is also a bar portion 15 or 16 either between the code and the number or above the number as shown in FIG. 1. Each of the tapes has secured thereto a knob 33 which extends upwardly from the tape through a slot 29 in the base member which slot is parallel to the trackways 31. The trackways may be omitted if desired since the knobs 33 sliding in slots 29 provide adequate guidance.

In order to set a particular number and its associated coding in such a manner that it is visible through the slot 27, it is only necessary to grasp and move a respective one of the knobs 33 causing the tape to move whereby a selected number and code becomes visible through slot 27. Members 26 automatically serve to curl or uncurl the end portions of the tape.

A desired setting of numbers and coding identifying the information to be stored and including filing information may be displayed upon the apparatus by setting the various tapes 30 at desired positions. The printed information which is to be recorded may be placed upon the portion 34 of the surface 28. The camera 35 is then operated to photograph the displayed code and information so as to produce a photographic film such as the card 10.

Referring to FIG. 5, there is illustrated an alternative embodiment to the device illustrated in FIGS. 2 and 3. This alternative embodiment comprises a table 36 having a slot 37 similar to the slot 27 of the above described embodiment. The various characters 40 and coding 41 are displayed through the slot 37 by depressing selected ones of push buttons 42. No mechanism is illustrated for performing this function but it will be understood that conventional mechanisms such as those used in calculating machines may be used. The particular document or information to be recorded is placed upon the portion 43 of the table 36 and the glass cover 45 is pivoted downwardly to cover the documents, numbers and coding. A camera 47 and photographic lamps 46—46 are used for photographing the documents, numbers and coding in order to produce a piece of photographic film such as the film 10. It should be noted that the camera 47 along with the lights 46 are mounted upon a vertical post 50 which, in turn, is fixed with relation to the table 36.

It should be obvious from the above description that the present invention provides an information carrying medium and an apparatus for making such a medium which includes visually readable characters for filing or retrieving the medium and a machine readable code for providing automatic filing and retrieval if so desired. It can also be seen that the present invention provides an information carrying medium and an apparatus for making such a medium which, in effect, locks together readable characters with coding suitable for actuating machine reading means. This feature serves to prevent errors which might occur if the code were set up in a separate step after the characters were set up. Furthermore, it can be seen that in the bars 15–18, the present invention provides an excellent means for setting off certain groups of the characters so as to assist an observer in reading the groups.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

We claim:

1. In combination, a card constructed to record in photographic form a plurality of bits of information on a coded basis and on a corresponding alpha-numeric basis and to record a photographic image identified by the plurality of bits of information, a holder for the card, there being a viewing slot in the holder to provide a visual indication, a plurality of tapes each retained by the holder and each separated from the other tapes in the plurality to obtain a sliding adjustment of the tapes on an individual basis in a particular direction, each of the tapes containing alpha-numeric information at displaced positions in the particular direction and containing coded information corresponding to the alpha-numeric information, the coded information on each tape being correspondingly displaced at positions in the particular direction corresponding to that of the coded information to obtain a simultaneous recording of particular alpha-numeric information and the corresponding coded information in accordance with the displacement of the tape in the particular direction, and means operatively and individually coupled to each tape in the plurality to facilitate a displacement of the tape in the particular direction, the holder being provided with curled ends to wind the tapes in accordance with the individual movement of the tapes in the particular direction.

2. In combination, a card constructed to record in photographic form a plurality of characters of information on a coded basis and to record a photographic image identified by the plurality of characters of information where the characters on the coded basis and the corresponding alpha-numeric basis are divided into groups each separated on the card from the other to facilitate identification, a plurality of elements each containing the different alpha-numeric and coded indications for all of the different values possible for an individual character and each movable in a particular direction to different positions in accordance with the selection of a different value for the character, a support member for the elements, there being a slot in the support member in a direction transverse to the particular direction to provide a visual indication of the character selected for each individual element in the plurality in accordance with the movement of the element in the particular direction, and a plurality of means each operatively coupled to a different element in the plurality to facilitate a movement of the coupled element in the particular direction in accordance with the operation of such means, the elements being tapes and the support member being provided with a flat configuration along which the tapes are slidable in the particular direction and the support member being provided with curled ends for receiving the ends of the tapes in accordance with the movement of the tapes in the particular direction.

References Cited by the Examiner

UNITED STATES PATENTS

| | | | |
|---|---|---|---|
| 1,205,719 | 11/1916 | Eaton | 235—61.12 |
| 1,801,458 | 4/1931 | Satterlee | 88—24 |
| 2,403,892 | 7/1946 | McFarlane et al. | 88—24 |
| 2,848,163 | 8/1958 | Serrell | 235—61.12 |
| 2,895,377 | 7/1959 | Manning. | |
| 2,936,684 | 5/1960 | Simjian | 95—1.1 |
| 2,975,282 | 3/1961 | Schaffer | 88—1 |

NORTON ANSHER, *Primary Examiner.*

EMIL G. ANDERSON, WILLIAM MISIEK, NORTON ANSHER, *Examiners.*